US008630363B2

(12) United States Patent
Seyedi-Esfahani et al.

(10) Patent No.: US 8,630,363 B2
(45) Date of Patent: Jan. 14, 2014

(54) SINGLE-CARRIER BLOCK TRANSMISSION WITH TRELLIS CODED MODULATION (TCM), MULTI-LEVEL CODED MODULATION (MLCM) AND BIT-INTERLEAVED MLCM (BIMLCM)

(75) Inventors: Seyed-Alireza Seyedi-Esfahani, Fairport, NY (US); Dagnachew Birru, Yorktown Heights, NY (US)

(73) Assignee: Koninklike Philips N.V., Eindhoven (NL)

(*) Notice: Subject to any disclaimer, the term of this patent is extended or adjusted under 35 U.S.C. 154(b) by 1006 days.

(21) Appl. No.: 12/447,491

(22) PCT Filed: Oct. 25, 2007

(86) PCT No.: PCT/IB2007/054351
§ 371 (c)(1),
(2), (4) Date: Feb. 8, 2010

(87) PCT Pub. No.: WO2008/053413
PCT Pub. Date: May 8, 2008

(65) Prior Publication Data
US 2010/0272203 A1    Oct. 28, 2010

Related U.S. Application Data

(60) Provisional application No. 60/863,856, filed on Nov. 1, 2006.

(51) Int. Cl.
*H04L 5/12* (2006.01)
*H04L 23/02* (2006.01)
(52) U.S. Cl.
USPC ........... 375/264; 375/260; 375/261; 375/262; 375/265; 370/464; 455/59; 455/60
(58) Field of Classification Search
USPC ...................................................... 375/264
See application file for complete search history.

(56) References Cited

U.S. PATENT DOCUMENTS

| | | | | |
|---|---|---|---|---|
| 5,371,548 A | * | 12/1994 | Williams | 348/478 |
| 5,651,032 A | * | 7/1997 | Okita | 375/341 |
| 2003/0073464 A1 | * | 4/2003 | Giannakis et al. | 455/562 |
| 2003/0076164 A1 | | 4/2003 | Giannakis et al. | |
| 2004/0178934 A1 | * | 9/2004 | Balakrishnan et al. | 341/80 |
| 2004/0264431 A1 | * | 12/2004 | Rhodes | 370/343 |
| 2005/0100118 A1 | * | 5/2005 | Zhang | 375/343 |
| 2007/0127587 A1 | * | 6/2007 | Ouyang et al. | 375/267 |
| 2008/0310519 A1 | * | 12/2008 | Seyedi-Esfahani et al. | 375/241 |
| 2010/0002792 A1 | * | 1/2010 | Seyedi-Esfahani | 375/260 |
| 2010/0146363 A1 | * | 6/2010 | Birru et al. | 714/752 |

OTHER PUBLICATIONS

Marc Frederik et al., Space-Time Block Coding for Single-Carrier Block transmission DS-CDMA Downlink, IEEE Journal on Selected Areas in Communications, vol. 21, No. 3, Apr. 2003.
S. Zhou et al., Single-Carrier Space-Time Block-Coded Transmissions Over Frequency-Selective Fading Channels, IEE Transactions of Information theory, vol. 49, No. 1, Jan. 2003.
Jwo-Yuh Wu et al., Periodic-Modulation Based Blind Channel Identification for Single-Carrier Block Transmission with frequency-Domain Equalization, 2005 IEEE 6th Workshop on Signal Processing Advances in Wireless Communications.
Duckdong Hwang et al., An Interleaved TCM Scheme for Single Carrier Multpile Transmit Antenna Systems, IEE Communications Letters, vol. 10, No. 6, Jun. 2006.

* cited by examiner

*Primary Examiner* — Shuwang Liu
*Assistant Examiner* — Gina McKie
(74) *Attorney, Agent, or Firm* — Larry Liberchuk (57) ABSTRACT

The system (900), transmitter (700), receiver (800.*a* 800.*b*), and method of the present invention provide a technique to code data bits into symbols using TCM, MLCM or BIMLCM before the symbols are placed in an SCBT block. Generally, TCM, MLCM, and BIMLCM do not have good performance over the frequency selective channels. However, since the frequency domain equalization of SCBT will flatten the channel, the use of TCM, MLCM and BIMLCM can provide significant gain. Furthermore, since some of the bits are left uncoded, the speed requirements on the encoder and decoder can be relaxed. This feature is especially important for the very high data rate systems.

13 Claims, 9 Drawing Sheets

SINGLE-CARRIER BLOCK TRANSMISSION WITH TRELLIS CODED MODULATION (TCM), MULTI-LEVEL CODED MODULATION (MLCM) AND BIT-INTERLEAVED MLCM (BIMLCM)

This invention relates to TCM, MLCM, or BIMLCM coding of data into symbols before the symbols are placed in an SCBT block such that one or more bits are left uncoded and performance is thereby improved.

In Single Carrier Block Transmission (SCBT) systems, a block of symbols (e.g. QAM or PSK) with length N, is preceded by a Guard Interval (GI), i.e. Cyclic Prefix (CP) or Zero Padding (ZP), before it is transmitted. Such a system is equivalent to an OFDM system with full spreading, if an N×N Fourier matrix is used as the spreading (code) matrix. The use of the GI and the block format of the SCBT enable the receiver to avoid any inter-block interference and use low complexity frequency domain equalization. Hence, similar to an OFDM system, an SCBT system can also be implemented with lower computational complexity.

The SCBT systems have the advantages of OFDM system in dealing with multipath but do not have some of the disadvantages of OFDM systems, e.g. high Peak to Average Power Ratio (PAPR). In terms of performance, the single carrier systems with GI outperform OFDM systems, if a weak and/or a high rate channel code (or no coding) is used.

Figure 1:
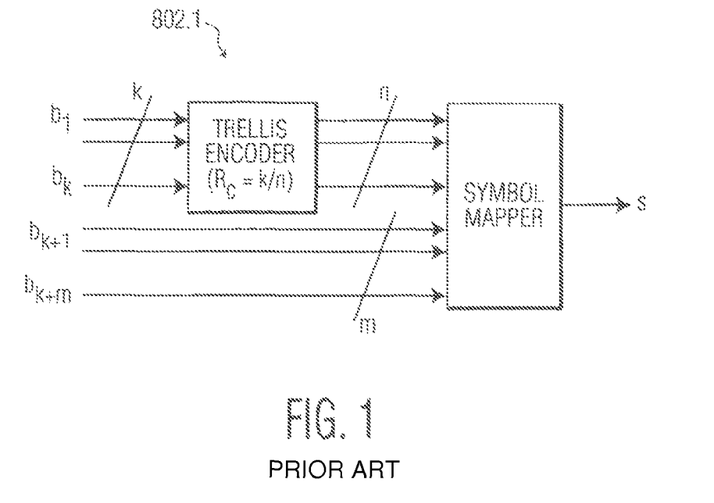
FIG. 1 illustrates Trellis Coded Modulation (TCM)

In Trellis Coded Modulation (TCM) the encoding of the bits and mapping of the coded bits to a constellation are not performed independently. Instead the bits are mapped to the constellation based on the level of protection that each bit enjoys from the encoding process. For example, as illustrated in FIG. 1, often a convolutional code is used to code k bits into n coded bits. These bits together with m uncoded bits are mapped to a $2^{n+m}$ point constellation. The bits are mapped such that the 0 and 1 values for the uncoded bits are placed on the constellation points that are a large distance from one other. The coded bits, on the other hand, are mapped such that their 0 and 1 values are located on the constellations points that are closer to each other. As a result, overall, the protection (distance) that each bit receives is increased.

Figure 2:
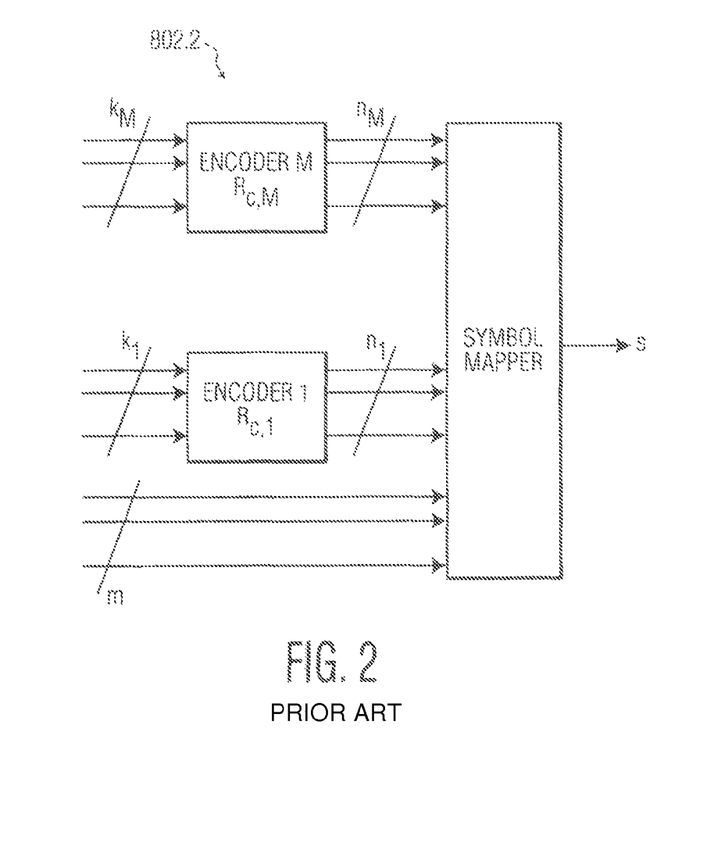
FIG. 2 illustrates Multi-Level Coded Modulation (MLCM)

In the Multi-Level Coded Modulation, different sets of data bits are coded using different codes, or are left uncoded. The coded bits are then mapped to the constellation points with regards to the amount of redundancy they receive from each code, illustrated in FIG. 2. It is also possible that some of the coded bits are interleaved before they are mapped to the symbols (Bit-Interleaved MLCM or BIMLCM).

TCM and MLCM can provide better performance than regular convolutional codes, if they experience an AWGN channel. When channel fading exists, the performance of TCM and MLCM degrades significantly. As a result these methods are not used in OFDM systems where each symbol experiences a different channel gain. In SCBT after the equalization, the symbols experience an equivalent AWGN channels. Hence using TCM and MLCM (or BIMLCM) can improve the performance. A way is needed to use TCM and MLCM codes to capture their significantly superior performance when compared to interleaved convolutional codes.

The method, apparatus and system provided by the present invention provide a way of employing TCM, MLCM or BIMLCM in an SCBT system to code less than all of the data bits and map all of the coded and uncoded data bits into symbols before the symbols are placed into SCBT block. The present invention can realize significantly superior performance in comparison with interleaved convolutional codes, which are conventionally used in the SCBT systems.

One component of this performance improvement from the use of TCM, MLCM or BIMLCM is that it relaxes the speed requirements of the encoder and decoder, compared to those required by a convolutionally coded SCBT. This is due to the fact that in the present invention one or more of the data bits are left uncoded, see FIGS. 4 and 5. Hence, given a desired data rate, the encoder and decoder are only required to run at a fraction of the bit rate that would be required by a convolutionally coded SCBT.

This invention is suitable for any SCBT system when larger constellations are employed. This invention is particularly attractive for the high bandwidth efficiency and high rate systems such as multi-gigabit 60 GHz WPAN systems.

FIGS. 4 a)-d) illustrates speed reduction factors for 8 point constellation and BIMLCM according to the present invention;

FIGS. 5 part 1 a)-c) and part 2 d) illustrate speed reduction factors for 16QAM and BIMLCM according to the present invention;

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and structure may be omitted from the current descriptions so as not to obscure the present invention.

A first preferred embodiment employs TCM, MLCM or BIMLCM to code the data bits into symbols before the symbols are placed in an SCBT block. Generally, TCM, MLCM and BIMLCM do not have good performance over the frequency selective channels. However, since the frequency domain equalization of SCBT will flatten the channel, (i.e. after equalization, the channel can be modeled with an AWGN channel), the use of TCM, MLCM or BIMLCM can provide significant gain. Furthermore, since some of the bits are left uncoded, the speed requirements on the encoder and decoder are relaxed. This feature is especially important for the very high data rate systems.

As one example only, assume an SCBT system with 8PSK modulation and compare performance a conventional SCBT system with bit-interleaved convolutional coding (Also known as Bit-Interleaved Coded Modulation or BICM) to a system according to the present invention where code rates of ⅔ and ⅚ are used, i.e., uses BIMLCM and TCM with similar equivalent rates.

To provide these equivalent rates, convolutional codes with rates ½ and ¾ are used with one uncoded bit per symbol. Hence the resulting overall rates are $(1+1)/(2+1)=⅔$ and $(3+2)/(4+2)=⅚$. In the conventional and BIMLCM cases the coded bits are interleaved before they are mapped to 8 PSK symbols. The uncoded bits are mapped to the 8 PSK symbols such that their 0 and 1 values are represented with the two opposite constellation points.

Based on the code, different mappings can be used to map the coded and uncoded bits to the symbols. In all cases, the 0 and 1 for the uncoded bits are located on the constellation points that are far from each other. The mapping of the coded bits will be dependent on the specific code and whether TCM, MLCM or BIMLCM is used. For example in the case of TCM an Ungerboeck partitioning (UP) can be used. The need for partitioning sets of lattice points arises in several applications. The most well known example is the design of trellis codes. Here, the set of $2^n$ lattice points, called the signal constellation, is divided into $2^m$ partitions, with the objective of maximizing the minimal distance between the points in each partition. Maximization of minimal intra-partition distance is important for reduction of the probability of erroneous decoding. Ungerboeck proposed a simple heuristic scheme for successive partitioning of the initial set of points, where at each stage the number of partitions is doubled, and the minimal intra-partition distance grows by a factor of $\sqrt{2}$ for the lattice $Z^2$. For the BIMLCM case the mapping can be similar to the mappings used for "pragmatic" TCM codes, where the coded bits are Gray-mapped on the constellation points.

Figure 3:
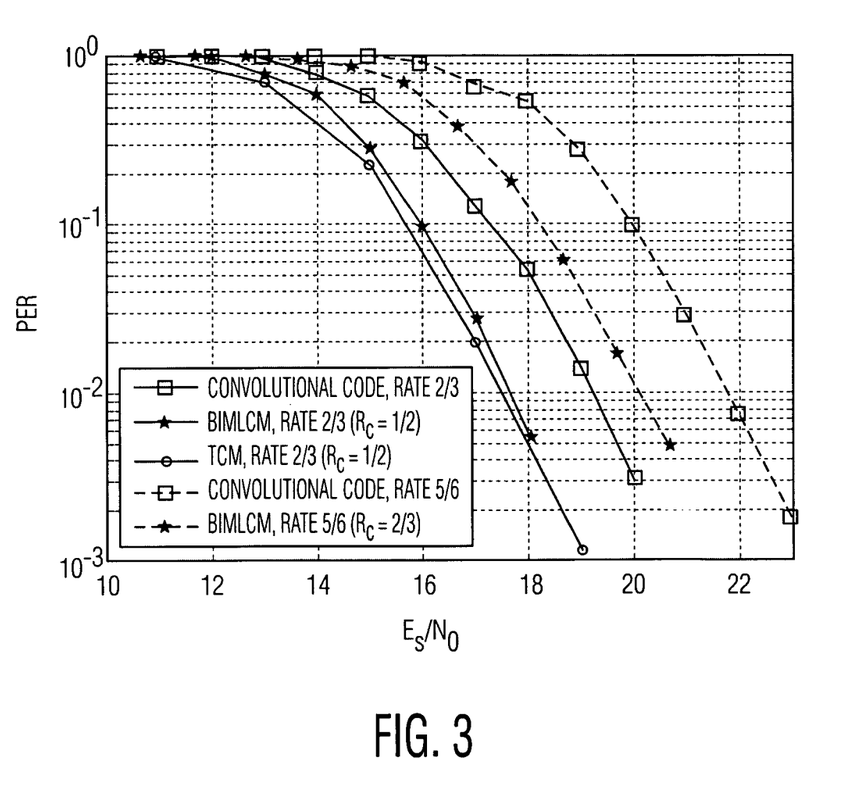
FIG. 3 illustrates a performance comparison of a conventional SCBT system and a system according to the present invention.

FIG. 3 depicts the Packet Error Rate (PER) performance of the one example system comparison detailed above. We can observe that in this particular example, both TCM and BIM-LCM perform approximately 1.5-2 dB better than the conventional system. Furthermore, the method of a preferred embodiment of the present invention has the advantage of relaxing the speed requirements of the encoder and decoder. In the conventional case, the encoder and decoder must operate at a speed equal to the bit rate. The method of a preferred embodiment of the present invention, on the other hand, relaxes this requirement to ½ and ⅗ of the bit rate, for the rate ⅔ and ⅚ cases, respectively. This is because in the ⅔ rate case only 1 out of every 2 bits, and in the ⅚ rate case 3 out of every 5 bits are encoded.

In general, by properly designing the codes and the constellations, significant performance gain can also be achieved.

Other embodiments of this invention include but are not limited to:
MLCM with or without bit interleaving (MLCM or BIM-LCM);
symbol interleaving after mapping and before SCBT;
different codes and/or constellations; and
SCBT with or without adaptive GI.

The choice of a specific code and constellation determine the data rate and the performance (operating range) of the system. There is generally a trade-off: The higher rate the shorter the range and vice versa. In practice, usually the system chooses the code and constellation (from a predefined set) based on the quality if its received signal (e.g. received power). Thus the system can operate at a high rate when conditions are good (short distance), but is also capable of operating at reduced rate when conditions are not so good.

Figure 4A:
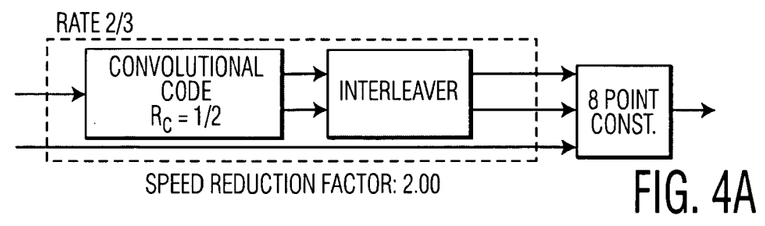
Figure 4B:
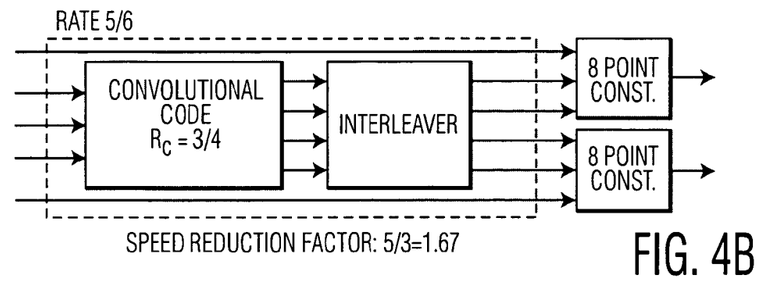
Figure 4C:
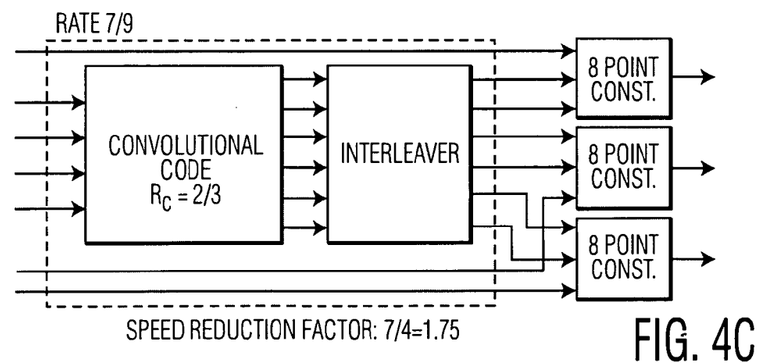
Figure 4D:
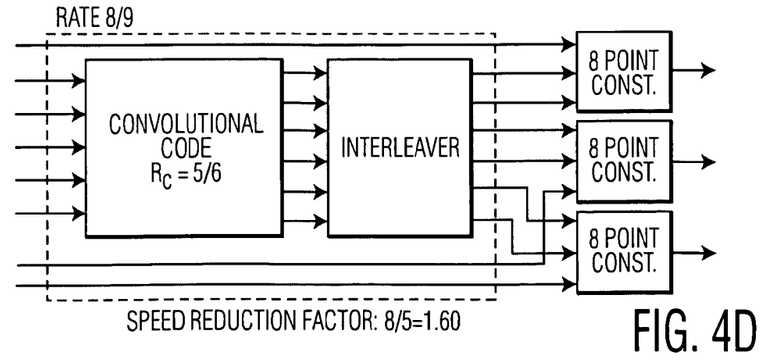
Figure 5A:
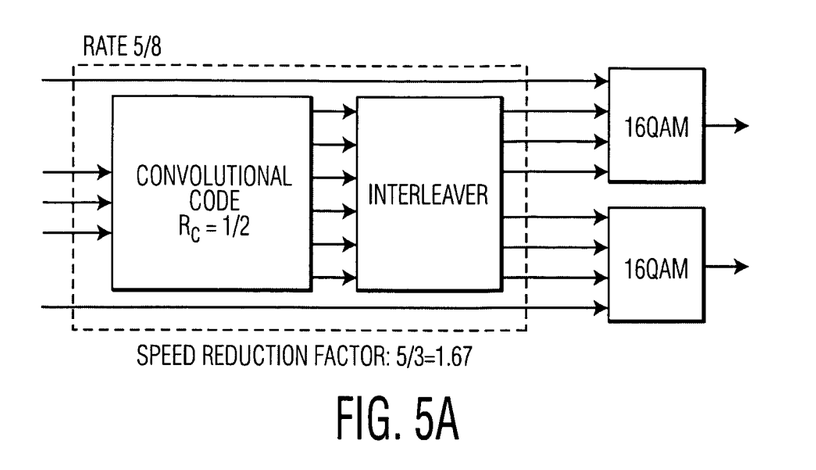
Figure 5B:
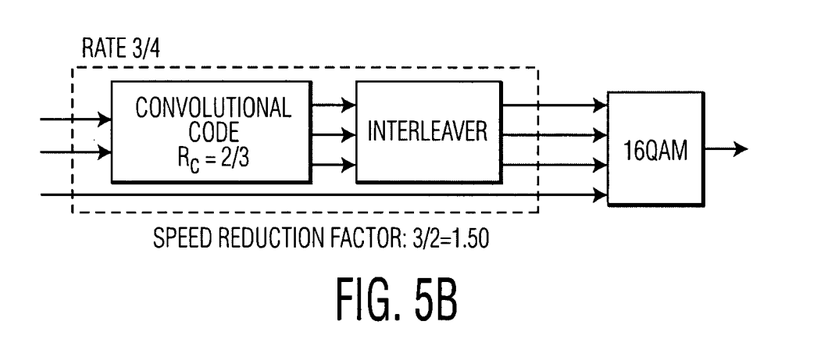
Figure 5C:
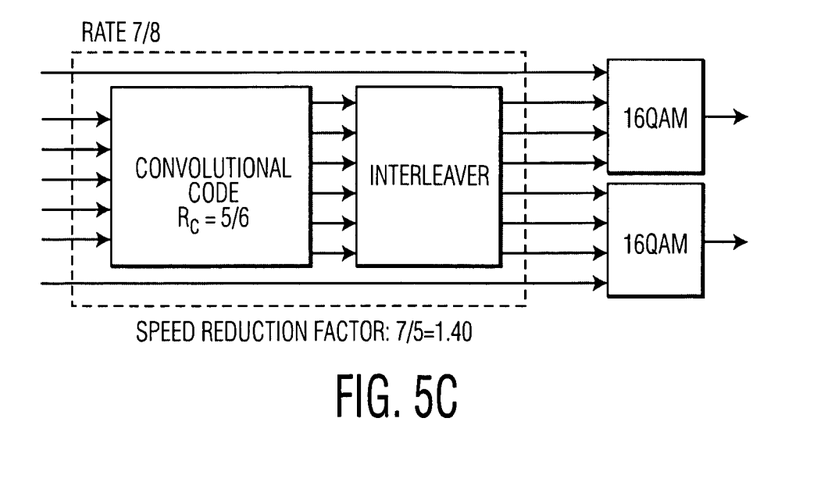
Figure 5D:
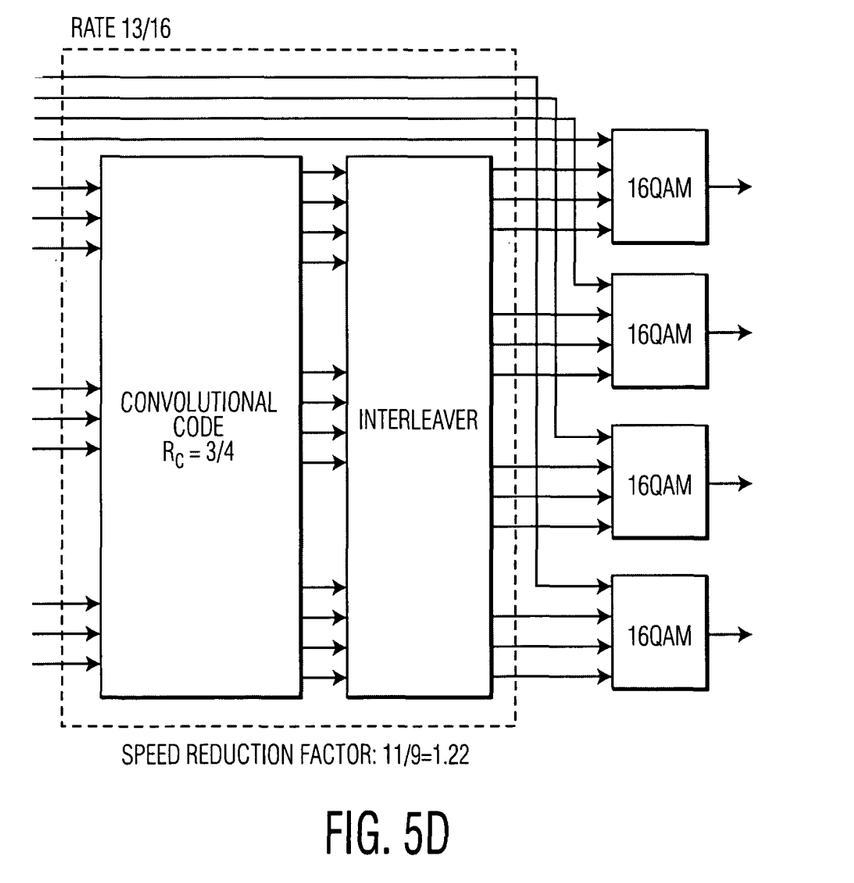

In a preferred embodiment, for bit-interleaved MLCM the present invention uses the same convolutional code and puncturing as is used for small constellations. Uncoded bits are mapped to the far constellation points. The resultant decoding speed reductions are illustrated in FIGS. 4a)-d) for an 8 point constellation and in FIGS. 5 part 1 a)-c) and part 2 d) for a 16 QAM constellation.

FIGS. 4 and 5 depict some exemplary embodiments of the SCBT with BIMLCM. Different overall rates are achieved using different code rates and number of uncoded bits. Embodiments for 8 and 16 point constellations are depicted in FIGS. 4 and 5, respectively. Similar schemes can also be used for TCM, MLCM, as well as for other constellation sizes.

Figure 6:
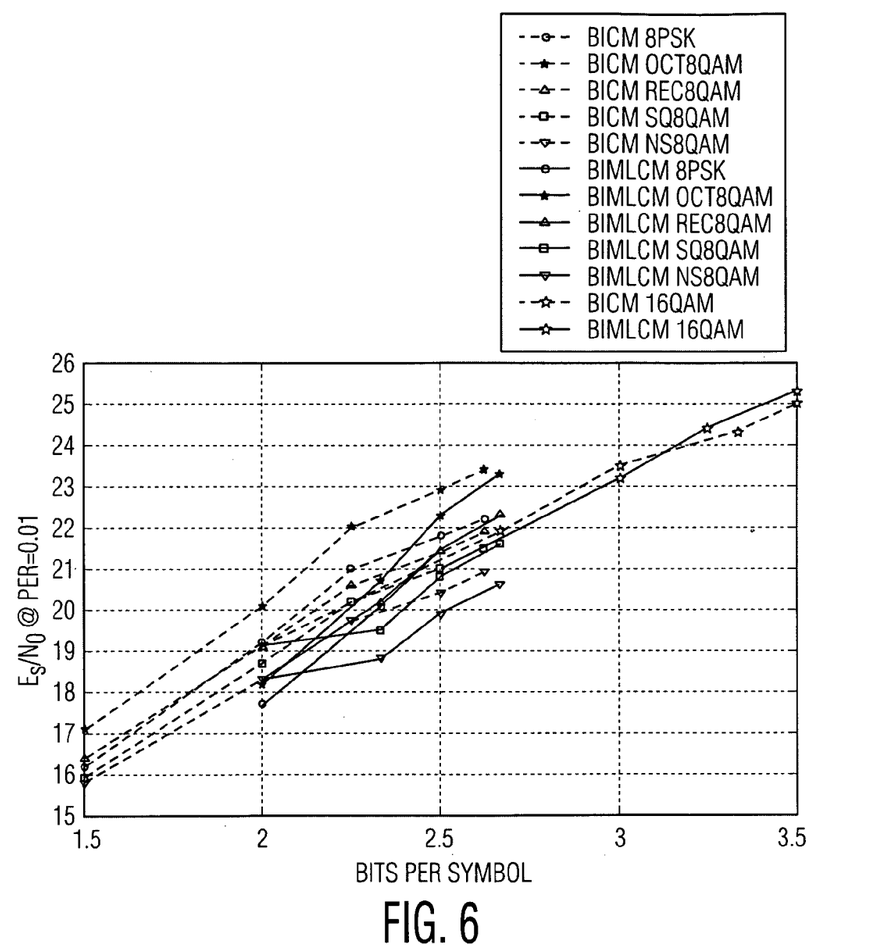
FIG. 6 illustrates a performance comparison between SCBT with bit interleaved convolutional code (BICM) and BIMLCM.

FIG. 6 illustrates the performance of the conventional SCBT system (BICM) and the SCBT with BIMLCM for different constellations (8PSK, OCT8QAM, SQ8QAM, NS8QAM, REC8QAM, 16QAM) and code rate. The performance is shown in terms of the required $E_s/N_0$ to achieve a PER of 0.01, as a function of the bandwidth efficiency (number of data bits per symbol). It can be seen that, generally BIMLCM has similar or better performance compared to BICM.

Figure 7:
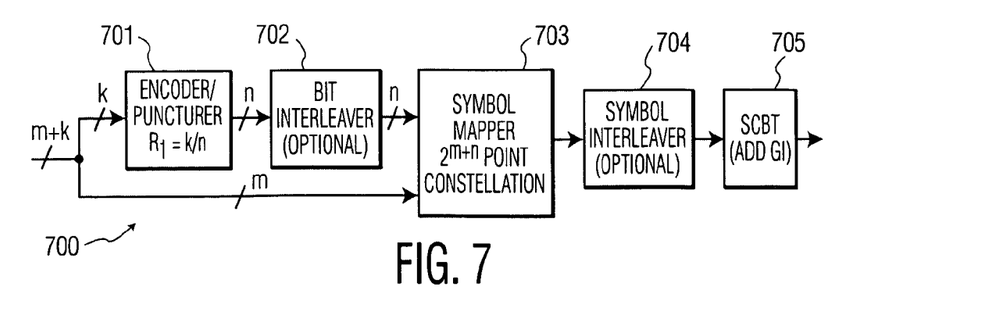
FIG. 7 illustrates transmitter modifications according to the present invention.

FIG. 7 illustrates one embodiment of the transmitter according to this invention. First the data bits are divided into two or more bit streams (two shown). The bits on one sub stream (k) are encoded with a code which has a rate of k/n (701). These coded bits are optionally interleaved (in BIM-LCM) 702. Then these bits, as well as m uncoded bits are mapped onto a $2^{m+n}$ point constellation to form symbols 703. The symbol are then optionally interleaved 704 before being placed in an SCBT block and then have a guard interval (GI) added 705.

Figure 8:
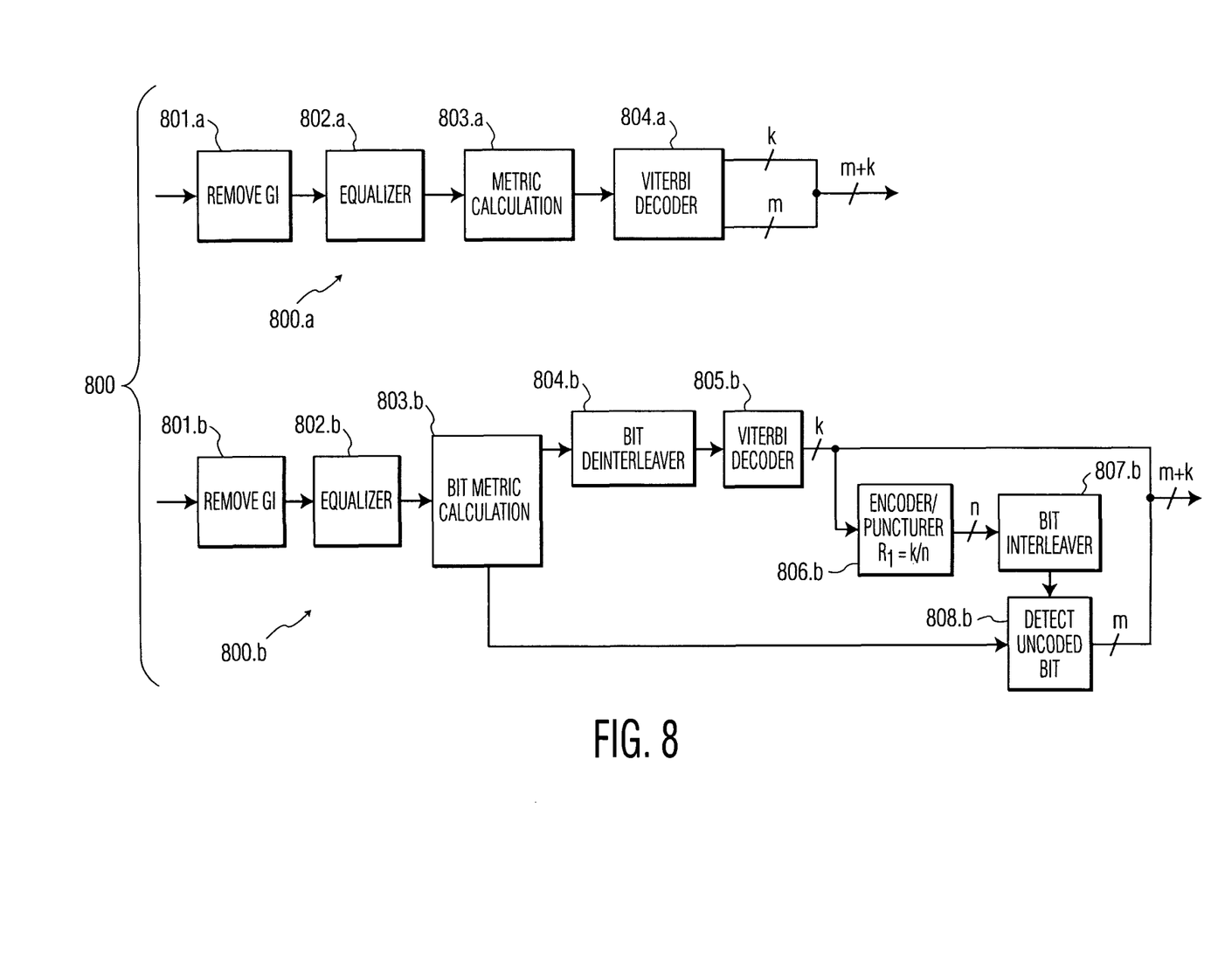
FIG. 8 illustrates receiver modifications according to the present invention.

FIG. 8 illustrates one embodiment of the receiver according to this invention. In the TCM or MLCM case (No bit interleaving) 800.a, first the GI is removed 801.a and the block is equalized 802.a. Then the symbol or bit metrics are calculated 803.a and sent to the Viterbi decoder 804.a. The Viterbi decoder decodes the coded bits and at the same time detects the uncoded bits.

In the BIMLCM case 800.b, after removal of GI 801.b and equalization 802.b, bit metrics are calculated 803.b. After de-interleaving these bit metrics 804.b, the Viterbi decoder decodes the coded bits 805.b. The decoded bits are then re-encoded 806.b and interleaved 807.b before they are used to detect the uncoded bits 808.b.

Figure 9:
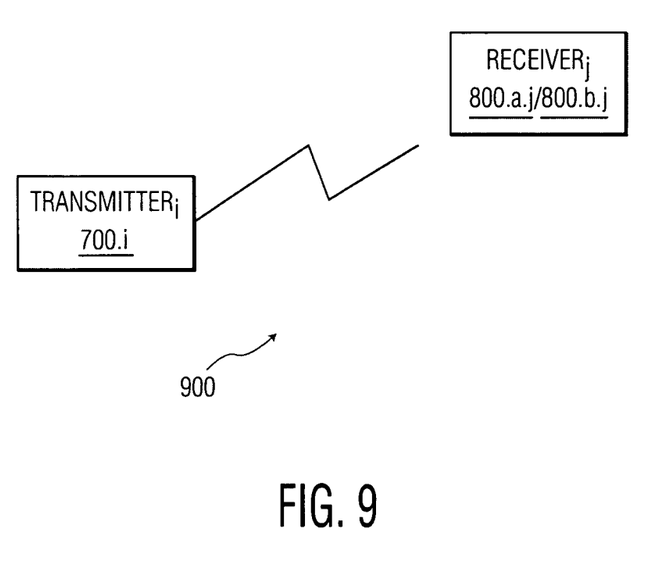
FIG. 9 illustrates a communication system modified according to the present invention.

FIG. 9 illustrates a communication system comprising at least one transmitter 700.i modified according to the present invention and at least one receiver 800.j modified according to the present invention.

Figure 10:
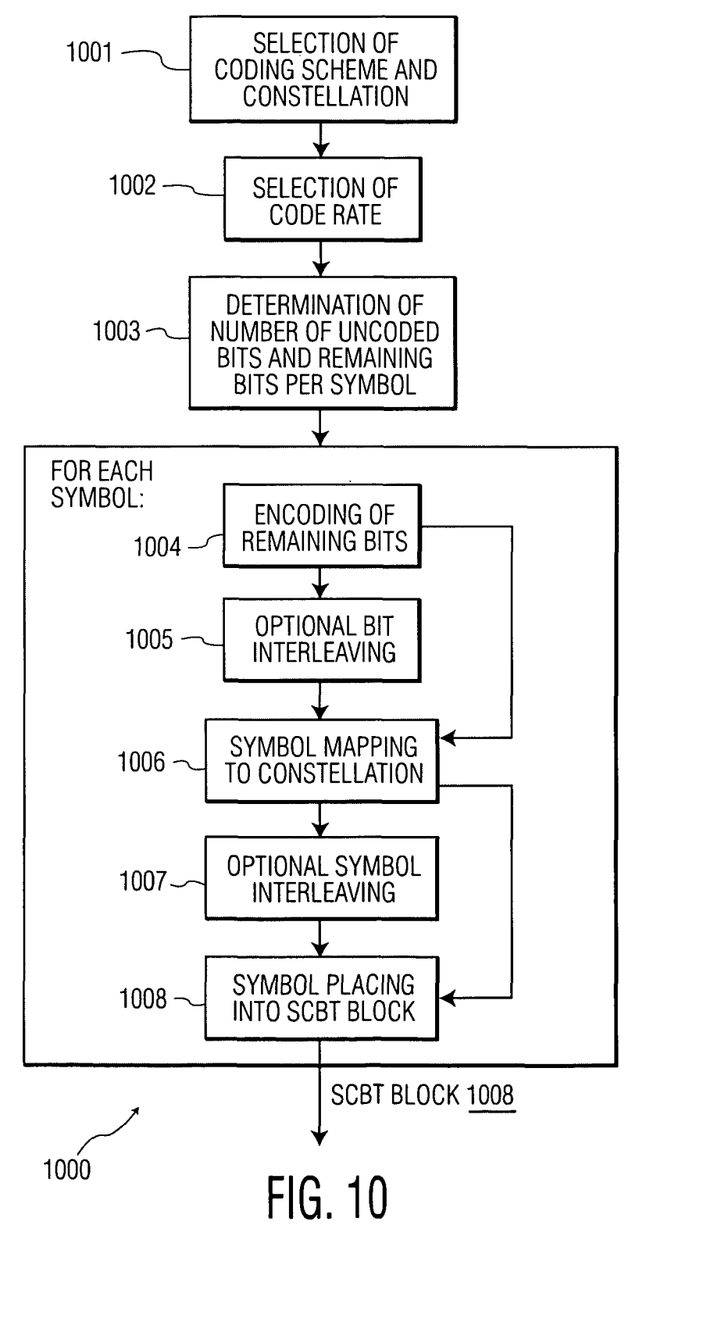
FIG. 10 illustrates a flow diagram of a method of a preferred embodiment of the present invention.

FIG. 10 illustrates a flow diagram of a method of a preferred embodiment of the present invention for enhancing performance of a single carrier block transmission (SCBT) communication stream of consecutive symbols s[l] where l>1, comprising the steps of:
specifying a coding scheme and a constellation for the communication stream 1001;
in accordance with the specified code and constellation, determining an equivalent code rate for a given rate of the SCBT system 1002;
for the determined rate, specifying a corresponding number of coded bits and thus determining a remaining number m≥1 of uncoded bits per symbol s[l] 1003; and
for each consecutive symbol s[l], performing the steps of:
coding k bits to form n coded bits 1004,
optionally interleaving the coded bits 1005,
mapping the n coded and m uncoded bits of each symbol s[l] to points of the specified $2^{m+n}$ point constellation 1006,
optionally interleaving the mapped symbols 1007, and
placing the mapped symbol into an SCBT block 1008.

While the preferred embodiments of the present invention have been illustrated and described, it will be understood by those skilled in the art that the system, apparatus and methods as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling within the scope of the claim appended hereto as well as all implementation techniques and not just the object oriented approach to implementation used as an example.

We claim:

1. A method for enhancing performance of a single carrier block transmission (SCBT) communication stream of consecutive symbols sill where l>1, comprising:
    specifying a coding scheme and a constellation for the communication stream;
    in accordance with the specified code and constellation;
    determining an equivalent code rate for a given rate of the SCBT stream;
    for the determined rate, specifying a corresponding number of coded bits, k, and thus determining a remaining number m≥1 of uncoded bits per symbol s[l]; and
    for each consecutive symbol s[l], performing: coding k bits to form n coded bits, mapping the coded and uncoded bits of each symbol sill to points of the specified constellation, and
    placing the mapped symbol into an SCBT block;
    wherein the coding further comprises selecting the coding scheme from a group consisting of trellis code modulation (TCM), a convolutional code with bit interleaving, a convolutional code without interleaving, multi-level coded modulation (MLCM) with bit interleaving, and MLCM without bit interleaving;
    for bit-interleaved MLCM (BIMLCM), employing as the specified code a convolutional code
    and puncturing used for small constellations; and
    wherein the mapping further comprises mapping uncoded bits to far points of the specified constellation.

2. The method of claim 1, further comprising interleaving symbols after the mapping and before the placing the mapped symbol into the SCBT block.

3. The method of claim 2, further comprising interleaving bits after the coding and before the mapping.

4. The method of claim 3, further comprising including an adaptive guard interval.

5. The method of claim 1, further comprising interleaving bits after the coding and before the mapping.

6. The method of claim 5, further comprising including an adaptive guard interval.

7. The method of claim 1, further comprising including an adaptive guard interval.

8. The method of claim 7, further comprising interleaving symbols after the mapping and before the placing the mapped symbol into the SCBT block.

9. The method of claim 8, further comprising interleaving bits after the coding and before the mapping.

10. The method of claim 7, further comprising interleaving bits after the coding and before the mapping.

11. A single carrier block transmission (SCBT) transmitter for a stream of m+k data bits, comprising:
    an encoder/puncturer that encodes a first stream of k bits of the stream of m+k data bits with a code having a rate of k/n and outputs a stream of n encoded bits as input to a bit interleaver, thereby leaving uncoded at least one second stream of a total of m bits;
    the bit interleaver, arranged between the encoder/puncturer and a symbol mapper, to interleave the bits of the stream of n encoded bits output by the encoder/puncturer and output an interleaved stream of n encoded bits as input to the symbol mapper in place of the stream of n encoded bits output by the encoder/puncturer as input to the symbol mapper;
    the symbol mapper that maps to a predefined constellation the m+n bits of a combined stream of the n encoded bits output by the encoder/puncturer and the m bits of the at least one second stream, and outputs a symbol stream as input to a symbol interleaver;
    the symbol interleaver, arranged between the symbol mapper and an SCBT module, to interleave the stream of symbols output by the symbol mapper and output an interleaved stream of symbols as input to the SCBT module in place of the symbol stream output by the symbol mapper as input to the SCBT module; and
    the SCBT module that places the output symbol stream of the symbol interleaver in an SCBT block and adds a guard interval thereto.

12. A receiver to receive an original stream of at least one consecutive bit-interleaved multi-level coded modulation (BIMLCM) single carrier block transmission (SCBT) block of symbols each having k coded and m uncoded bits, comprising:
    a module that removes a guard interval (GI) from an SCBT block of the original stream and outputs the SCBT block without the GI;
    an equalizer that receives the SCBT block without the GI output by the module, equalizes the received SCBT block and outputs an equalized SCBT block therefor;
    a metric calculator that receives the equalized SCBT block output by the equalizer, calculates bit metrics for the received SCBT block, and outputs the calculated bit metrics therefor;
    a bit de-interleaver that receives the bit metrics, de-interleaves the bits metrics and outputs the de-interleaved bit metrics;
    a Viterbi decoder that receives the de-interleaved bit metrics, decodes the coded bits and outputs the decoded bits as a stream of k decoded bits;
    an encoder/puncturer that receives and re-encodes the stream of k bits data bits with a code having a rate of k/n and outputs a stream of n re-encoded bits;
    a bit interleaver that receives and interleaves the re-encoded stream of n bits and outputs a stream of n interleaved bits; and
    a detector that receives the calculated bit metrics output by the metric calculator, the stream of k decoded bits output by Viterbi decoder, and the stream of n interleaved bits output by the bit interleaver, and detects and outputs the m uncoded bits of the original stream.

13. A communication system for bit-interleaved multi-level coded modulation (BIMLCM) blocks, comprising:
    at least one single carrier block transmission (SCBT) transmitter for transmitting a stream of at least one consecutive BIMLCM SCBT block of symbols each having m+k data bits of which k are coded and m are uncoded, comprising:
    an encoder/puncturer that encodes a first stream of k bits of the stream of m+k data bits with a code having a rate of k/n and outputs a stream of n encoded bits thereby leaving uncoded at least one second stream of a total of m bits,
    a bit interleaver that receives and interleaves the bits of the stream of n encoded bits output by the encoder/puncturer and outputs an interleaved stream of n encoded bits, a symbol mapper that maps to a predefined constellation the m+n bits of a combined stream of the n encoded bits output by the encoder/puncturer and the m bits of the at least one second stream, and outputs a symbol stream, a symbol interleaver to receive and interleave the stream of symbols output by the symbol mapper and output an interleaved symbol stream, and a SCBT module to receive and place the interleaved symbol stream output by the symbol interleaver in an SCBT block and add a guard interval thereto;

at least one receiver to receive the transmitted stream of the SCBT transmitter, comprising:

a module that removes a guard interval (GI) from the SCBT block of the received stream and outputs the SCBT block without the GI;

an equalizer that receives the SCBT block without the GI output by the module, equalizes the received SCBT block and outputs an equalized SCBT block therefor;

a metric calculator that receives the equalized SCBT block output by the equalizer, calculates bit metrics for the received SCBT block, and outputs the calculated bit metrics therefor;

a bit de-interleaver that receives the bit metrics, de-interleaves the bit metrics and outputs the de-interleaved bit metrics;

a Viterbi decoder that receives the de-interleaved bit metrics, decodes the coded bits and outputs the decoded bits as a stream of k decoded bits;

an encoder/puncturer that receives and re-encodes the stream of k data bits with a code having a rate of k/n and outputs a stream of n re-encoded bits;

a bit interleaver that receives and interleaves the re-encoded stream of n bits and outputs a stream of n interleaved bits; and a detector that receives the calculated bit metrics output by the metric calculator, the stream of k decoded bits output by Viterbi decoder, and the stream of n interleaved bits output by the bit interleaver, and detects and outputs the m uncoded bits of the received stream.

* * * * *